(12) United States Patent
Van Caldwell et al.

(10) Patent No.: US 9,336,201 B2
(45) Date of Patent: *May 10, 2016

(54) REGULAR EXPRESSION WORD VERIFICATION

(71) Applicant: Microsoft Technology Licensing, LLC, Redmond, WA (US)

(72) Inventors: Nicholas Van Caldwell, Lake Forest Park, WA (US); Ravi Chandru Shahani, Redmond, WA (US); Katherine J. Brainard, Stanford, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 95 days.

This patent is subject to a terminal disclaimer.

(21) Appl. No.: 14/099,404

(22) Filed: Dec. 6, 2013

(65) Prior Publication Data

US 2014/0122061 A1 May 1, 2014

Related U.S. Application Data

(63) Continuation of application No. 11/823,884, filed on Jun. 29, 2007, now Pat. No. 8,630,841.

(51) Int. Cl.
*G10L 15/00* (2013.01)
*G10L 15/18* (2013.01)
*G06F 17/27* (2006.01)

(52) U.S. Cl.
CPC ............ *G06F 17/277* (2013.01); *G06F 17/273* (2013.01)

(58) Field of Classification Search
USPC .............................................. 704/8–10, 257
See application file for complete search history.

(56) References Cited

U.S. PATENT DOCUMENTS

| | | | |
|---|---|---|---|
| 4,672,571 A | 6/1987 | Bass et al. | |
| 4,701,851 A | 10/1987 | Bass et al. | |
| 4,771,401 A | 9/1988 | Kaufman et al. | |
| 4,777,617 A | 10/1988 | Frisch et al. | |
| 4,873,634 A | 10/1989 | Frisch et al. | |
| 5,225,981 A | 7/1993 | Yokogawa | |
| 5,497,319 A | 3/1996 | Chong et al. | |
| 5,778,361 A | 7/1998 | Nanjo et al. | |
| 5,845,306 A | 12/1998 | Schabes et al. | |
| 5,867,812 A | 2/1999 | Sassano | |
| 5,907,821 A | 5/1999 | Kaji et al. | |
| 6,163,785 A | 12/2000 | Carbonell et al. | |
| 6,173,253 B1 | 1/2001 | Abe et al. | |
| 6,223,059 B1 * | 4/2001 | Haestrup | 455/566 |
| 6,349,282 B1 | 2/2002 | Van Aelten et al. | |
| 6,351,843 B1 | 2/2002 | Berkley et al. | |

(Continued)

OTHER PUBLICATIONS

"Advanced Parsing Techniques," Part of the TADS Parser Manual, Copyright 1993-2000 by Michael J. Roberts, Chapter 5. 34 Pages.

(Continued)

*Primary Examiner* — Olujimi Adesanya
(74) *Attorney, Agent, or Firm* — Jessica Meyers; Tom Wong; Micky Minhas

(57) ABSTRACT

The present disclosure is directed to a method of verifying a compound word. The method includes receiving an input signal indicative of a textual input and accessing a rule and a lexical data structure from data stores. The rule is applied to the textual input to determine whether the textual input is a valid compound word. An output signal is provided that is indicative of whether the textual input is a compound word.

12 Claims, 5 Drawing Sheets

(56) References Cited

U.S. PATENT DOCUMENTS

| | | | |
|---|---|---|---|
| 6,393,399 B1 * | 5/2002 | Even | G10L 15/193 704/235 |
| 6,513,006 B2 | 1/2003 | Howard et al. | |
| 6,694,325 B2 | 2/2004 | Jas | |
| 6,754,617 B1 | 6/2004 | Ejerhed | |
| 6,757,647 B1 | 6/2004 | Nathan et al. | |
| 7,120,582 B1 | 10/2006 | Young et al. | |
| 7,158,930 B2 | 1/2007 | Pentheroudakis et al. | |
| 7,421,386 B2 | 9/2008 | Powell et al. | |
| 7,555,428 B1 | 6/2009 | Franz et al. | |
| 7,809,744 B2 * | 10/2010 | Nevidomski | G06F 17/30985 707/759 |
| 8,630,841 B2 | 1/2014 | Van Caldwell et al. | |
| 2002/0087515 A1 | 7/2002 | Swannack et al. | |
| 2003/0097252 A1 | 5/2003 | Mackie | |
| 2004/0193399 A1 | 9/2004 | Potter et al. | |
| 2005/0091030 A1 | 4/2005 | Jessee et al. | |
| 2005/0091031 A1 | 4/2005 | Powell et al. | |
| 2005/0091033 A1 | 4/2005 | Valdes et al. | |
| 2006/0184516 A1 * | 8/2006 | Ellis | 707/3 |
| 2006/0282442 A1 | 12/2006 | Lennon et al. | |

OTHER PUBLICATIONS

Frisch, Rudolf, et. al., "Spelling Assistance for Compound Words," vol. 32, No. 2, Mar. 1988, pp. 195-200. 6 Pages.

Prosecution History of U.S. Appl. No. 11/823,884.

* cited by examiner

US 9,336,201 B2

REGULAR EXPRESSION WORD VERIFICATION

CROSS-REFERENCE TO RELATED APPLICATION

The present application is a continuation of and claims priority of U.S. patent application Ser. No. 11/823,884, filed Jun. 29, 2007, the content of which is hereby incorporated by reference in its entirety.

BACKGROUND

Systems that perform natural language processing such as spell checkers, grammar checkers and the like encounter compound words during the course of processing textual inputs. The large number of words that can be formed from two or more words into compound words make it difficult to create a lexicon to recognize a large number of compound words. Furthermore, the combination of two or more words may result in the alteration of at least one of the words in the resultant compound word.

Thus, natural language processing systems advantageously include the ability to dynamically recognize compound words that include words or word segments stored in a lexicon, even if the compound word itself is not stored in the lexicon. Dynamic recognition of compound word can include the application of rules to entries in a lexicon. Typically such rules are hard coded into an algorithm.

While dynamic recognition of compound words provides a way to recognize valid words that may not be a part of the lexicon, some issues remain. For example, such schemes for dynamic recognition are limited to the usage of rules previously encoded into the algorithm. Thus, any additional rules or lexicon entries will necessitate a recompilation of the entire algorithm or the creation of an entirely new algorithm. Therefore, what is needed is a dynamic recognition scheme that addresses these issues.

The discussion above is merely provided for general background information and is not intended to be used as an aid in determining the scope of the claimed subject matter.

SUMMARY

In one illustrative embodiment, a method of verifying a compound word is discussed. The method includes receiving an input signal indicative of a textual input and accessing a rule and lexical data from a data store. The rule is applied to the textual input to determine whether the textual input is a valid compound word. An output signal indicative of whether the textual input is a compound word is provided.

In another illustrative embodiment, a computer based system having instructions stored on a tangible medium for identifying a pattern is discussed. When the instructions are executed, the system performs the steps of receiving a textual input and accessing a rule having a first instruction related to a desired pattern of the textual input. In addition, the system identifies a first entry in the lexical data structure related to the first instruction and compares a portion of the textual input with a portion of the first entry. The system provides an output signal indicative of whether the textual input matched the desired pattern.

In still another embodiment, a computer based system for verifying the validity of a compound word is discussed. The system includes a lexical data structure stored on a tangible medium including a plurality of lexical segments and meta data associated with the lexical segments. The system further includes a rule data structure stored on a tangible medium including at least one node that includes information related to the meta data in the lexical data structure. A remote engine from the lexical data structure and the rule data structure and capable of accessing the lexical data structure and the rule data structure to determine whether a textual input is a valid compound word.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
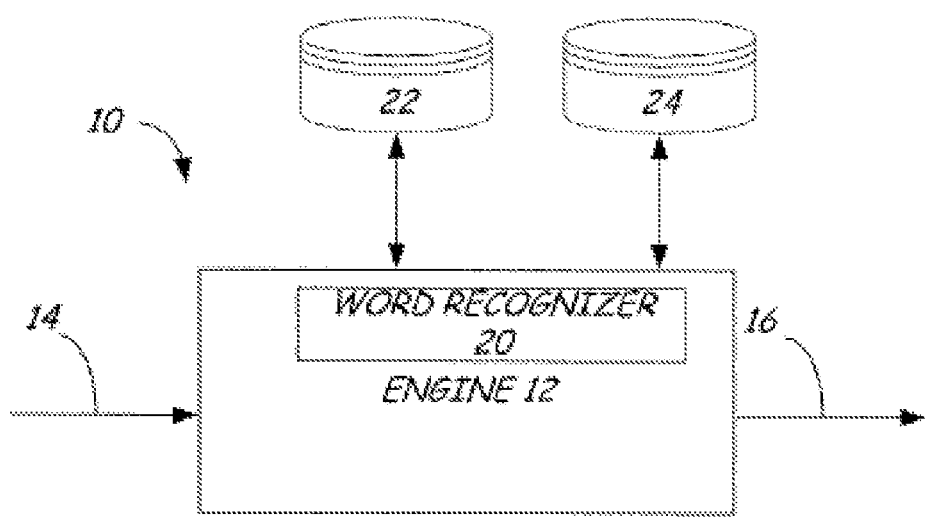
FIG. 1 is a block diagram of a system capable of verifying compound words in a natural language processing application according to one illustrative embodiment.

FIG. 1 illustrates a system 10 for recognizing compound words according to one illustrative embodiment. System 10 includes an engine 12 that receives an input 14. Input 14 is an indication of a textual string. For example, input 14 can be a single word or a collection of words. Engine 12 is adapted to receive the input 14 and analyze the input 14 to determine whether each word in the input string is valid. The engine 12 then provides an output 16 that illustratively indicates status of each of the words in the input string. Input 14 can be provided by any number of sources. For example, the input 14 can be provided to the engine 12 by a word processor, a spell checker, a grammar checker, or any other type of application that benefits from the recognition of compound words. The output 16 is illustratively provided to the source of the input 14. Alternatively, the output 16 can be provided to any type of suitable application.

The engine 12 illustratively includes a compound word recognizer 20. In one embodiment, engine 12 is an algorithm that includes the compound word recognizer 20. Alternatively, the compound word recognizer 20 is independent of the algorithm in the engine 12. The compound word recognizer 20 includes an algorithm that accesses a rules data store 22 and a lexicon data store 24. The rules data store 22 and lexicon data store 24 include information that is used to recognize whether an input text string is a compound word. While separate data stores are illustrated in FIG. 1 for the rules data store 22 and the lexicon data store 24, it should be appreciated that a single physical device can provide storage for both the rules data store 22 and the lexicon data store 24.

Figure 2:
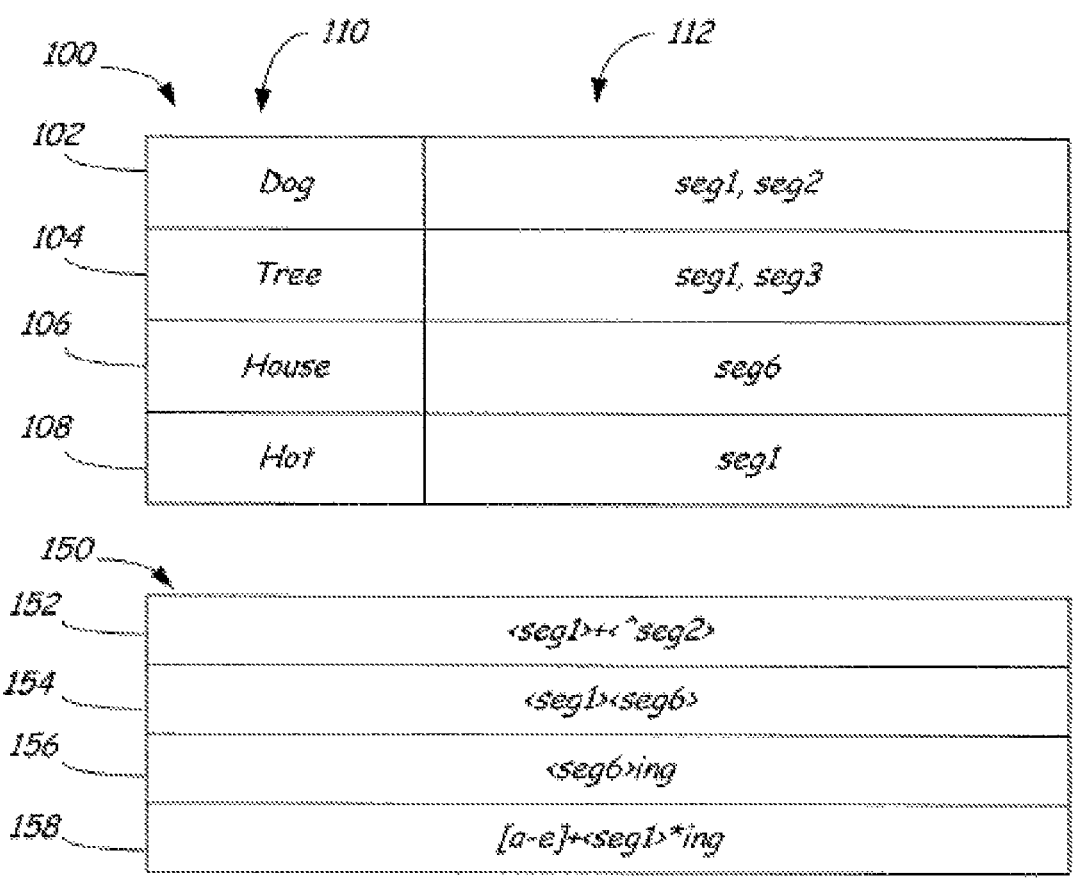
FIG. 2 provides an example of a small lexicon and rule structure suitable for use in the system illustrated in FIG. 1.

FIG. 2 illustrates a lexicon data structure 100 of the type found in lexicon data store 24 and a rules data structure 150 of the type found in rules data store 22. The lexicon data structure 100 illustratively includes a plurality of entries 102, 104, 106, and 108. Each of the entries 102, 104, 106 and 108 illustratively includes a segment field 110 and a meta data field 112, although it should be appreciated that other entries may not include meta data information. The segment field 110 of each entry includes an indication of a textual string that is known to be part of at least one compound word that can be recognized by system 10. While the textual strings located in each of the segment fields 110 are described as segments, the textual string in any particular segment field 110 can include a segment that is, in fact, a stand alone word, as opposed to merely a segment or a portion of a word. The meta data field 112 includes information about the textual string in the segment field 110. The meta data in each meta data field 112 is, in one illustrative embodiment, related to information stored in the rules data structure 150. The nature of that relationship will be discussed in more detail below.

The rules data structure 150 illustratively includes a plurality of entries 152, 154, 156, and 158. Each of the entries in the rules data structure 150 includes a rule that can be applied to and input text string to determine whether the input text string is a valid compound word.

In one illustrative embodiment, the rules stored in the rules data structure 150 are syntactically represented in a regular-expression language. For example, the rules illustrated in a modified form of PERL. The regular expression language has been illustratively modified to include an additional matching bracket to identify a segment matching operation. The segment matching operation specifies when textual input should be matched based on entries in the lexicon data structure 100 and the rules data structure 150. The matching bracket that signals a segment operation is illustratively represented with "< >" brackets, with a comma delimited list of segment entries that represent segments that provide a match for a particular rule. It should be appreciated that any number of different representations can be used without departing from the scope of the discussion.

As an example, to construct a rule that matches entries in the lexicon data store 100 that were described as being segment bits seg2, seg4, or seg6 in their meta data field, the rule would include the following syntax
    <seg2, seg4, seg6>
While the matching bracket is illustratively shown as employing an OR operation, alternatively the matching bracket can employ an AND operation. For example, by delimiting the list with a semi-colon, the matching bracket now looks for a segment described as being all of the listed segments. Thus,
    <seg1; seg3>
requires an entry in the lexicon data store 100 to be described as both a seg1 segment bit and a seg3 segment bit before the entry is considered to be a match. Of course, it should be appreciated that any other logical operation can be provided for in the segment matching operation syntax without departing from the spirit and scope of the discussion.

The matching bracket syntax is capable of being integrated with other standard regular expressions to create rules for the rules data structure 150. Thus, a rule that looks for a textual input with any number of English vowels, followed by an entry from the lexicon data store 100 described as a seg2, and followed by the word chair would be written as follows:
    [aeiou]*<seg2>chair As discussed above, the lexicon data structure 100 includes entries that have both a segment field 110 and a meta data field 112. The meta data field 112 illustratively includes a list of zero or more segment bits that are attached to a textual string stored in the segment field 110. For example, entry 102 includes the textual string "dog" in its segment field 110 and segment bits "seg1" and "seg2" in its meta data field 112. Thus, the segment bits seg1 and seg2 are attached to the textual string "dog". Each of the other entries 104, 106 and 108 have representative textual inputs and corresponding meta data.

Figure 3:
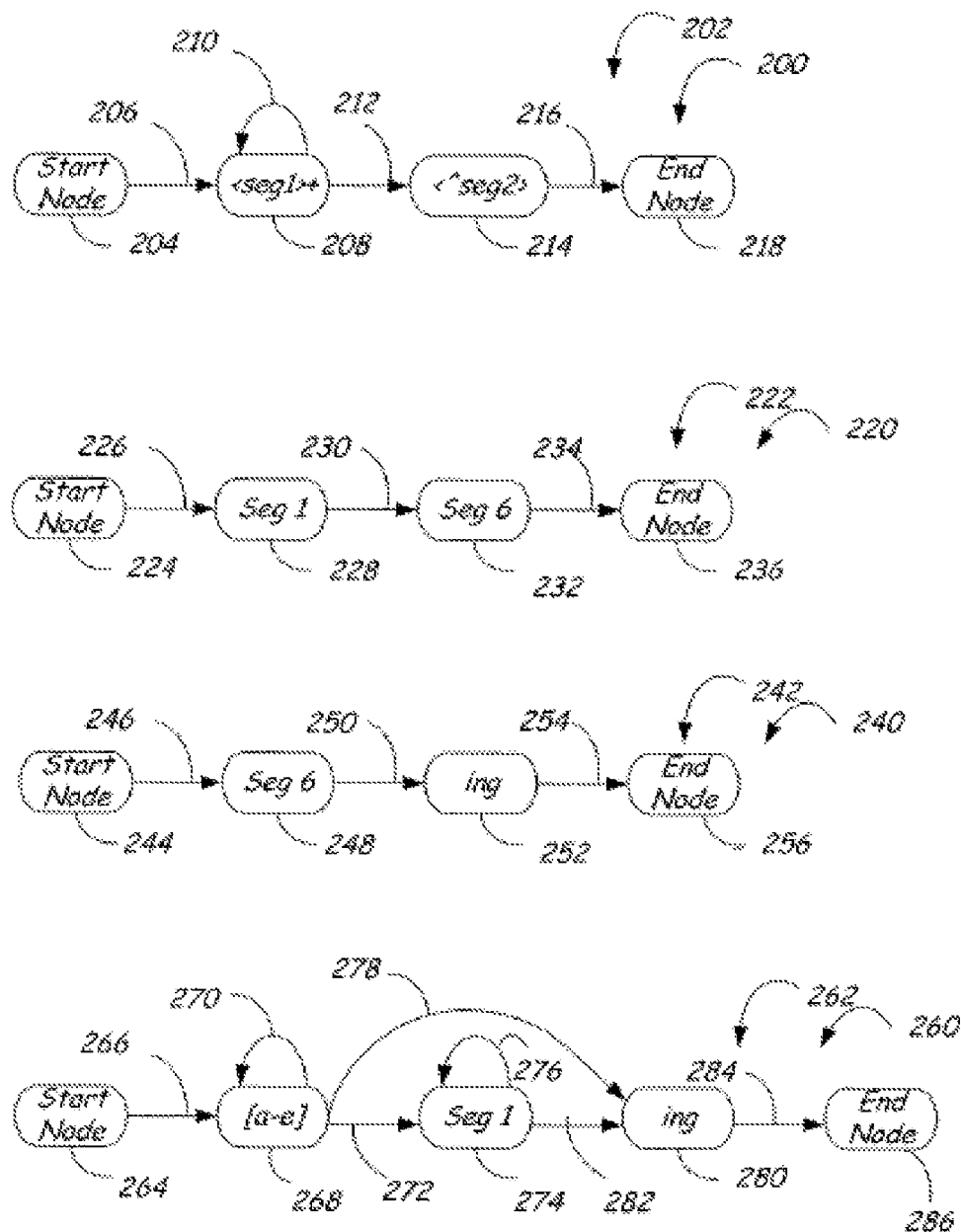
FIG. 3 illustrates block diagrams of the rules of FIG. 2 illustrating nodes and links to nodes after the rules have been parsed.

FIG. 3 illustrates how rules stored in rules data structure 150 are parsed and stored in the store according to one illustrative embodiment. Rule structure 200 represents the structure of a rule 202 that has been parsed. Rule 202 is illustratively indicated as <seg1>+<^seg2> in entry 152 of data structure 150. Rule 202 includes two substantive nodes, indicated as <seg1>+ and <^seg2> and discussed in more detail below. Traversing the rule structure 200 begins at start node 204. Start node 204 has a link 206 that points to segment node 208.

Segment node 208 is illustratively associated with the <seg1>+ node identified above. Segment node 208 is a segment data operation that returns a match if the beginning of the textual input matches one or more entries in the lexicon data structure 100 that is also identified as a seg1 entry. The process of matching the beginning of the textual input "consumes" the characters in the textual input that match seg1. The "+" character indicates that the segment node 208 returns a match when it encounters one or more consecutive patterns in the textual input that match a seg1 entry. Thus, a textual input with more than one consecutive pattern that matches the seg1 entry will match the seg1 entry multiple times. Each match will then be consumed. This is represented graphically by having segment node 208 with a link 210 back to itself. Segment node 208 also has a link 212 to a segment node 214, meaning that the rule requires a match of segment node 214 after it matches segment node 208.

Segment node 214 is identified as being associated with all entries in the lexicon data structure 100 that are not identified as a seg2 bit, because of the "^" symbol that precedes the "seg2" notation. Thus, any entry in the lexicon data store that is not a seg2 bit is a potential match with the beginning of the textual input not already consumed by a match of segment 208. Segment node 214 has a link 216 that points to an end node 218.

Rule structure 220 represents a parsed rule 222 that is indicated as "<seg1><seg6>" in entry 154 of rules data structure 150. Rule structure 220 includes a start node 224, which has a link 226 to a segment node 228. Segment node 228 is associated with the substantive node <seg1> and returns a match if the beginning of the textual input matches one or more entries in the lexicon data store 200 identified as a seg1 entry. Segment node 228 has a link 230 to segment node 232. Segment node 232 is associated with the substantive node <seg6> and returns a match if the beginning of the textual input remaining after the consumption by segment node 214 matches one or more entries in the lexicon data structure 100 identified as a seg6 entry. Segment node 232 has a link 234 to end node 236.

Rule structure 240 represents a parsed rule 242 that is indicated as "<seg6>ing" in entry 156 of rules data structure 150. Rule structure 240 includes a start node 244, which has a link 246 to a segment node 248. Segment node 248 is illustratively associated with the seg6 bit and returns a match if the beginning of the textual input matches one or more entries in the lexicon data structure 100 that is also identified as a seg6 entry. Segment node 248 has a link 250 to a text string node 252 with a value of "ing". The text string node 252 returns a match if the beginning of the remaining textual input matches the text string exactly. Unlike the segment nodes discussed above, the text string node 252 is attempting to match a specific string that is coded into the rules. Text string node 252 has a link 254 to an end node 256.

Rule structure 260 represents a parsed rule 262 that is indicated as "[a–e]+<seg1>*ing" in entry 158 of rules data structure 150. Structure 260 includes a start node 264, which has a link 266 to a character node 268. Character node 268 is represented by brackets and identifies a range of characters. A match is returned when the first character in the textual input is within the range of the listed characters. Character node 268 is illustratively configured to match a single character, as opposed to a string of characters matched by the text string node 252 discussed above. However, the character node 268 also has a link 270 to itself, which is represented by the "+" symbol in the rule indication. Therefore, any number of consecutive characters that match one of the characters identified by the character node 268 constitutes one or more matches. Character node 268 also has a link 272 to a segment node 274.

Segment node 274 is illustratively associated with the seg1* bit illustrated in entry 158. The "*" character in entry 158 indicates that zero or more instances of a seg1 match with the beginning of the textual input constitute a match of segment node 274. This is illustrated by a link 276, which links 274 to itself. In addition, character node 268 has a link 278 to text string node 280, thereby bypassing segment node 274 completely. Segment node 274 also has a link 282 to text string node 280, indicating that the text string "ing" can follow either a match of character node 268 or segment node 274. Text string node 280 has a link 284 points to end node 286.

The links in each of the rule structures discussed above provide traversal paths through the rule structure attempting to verify a compound word. The nodes provide a description of different segment matches that need to be made to verify the compound word. The rules and lexical entries discussed above are for illustrative purposes only. In practice, any number of entries can be located in the lexicon data store 100. Further, the segment nodes discussed above are capable of being incorporated into any number of rules, with other operations than the ones discussed herein.

Figure 4:
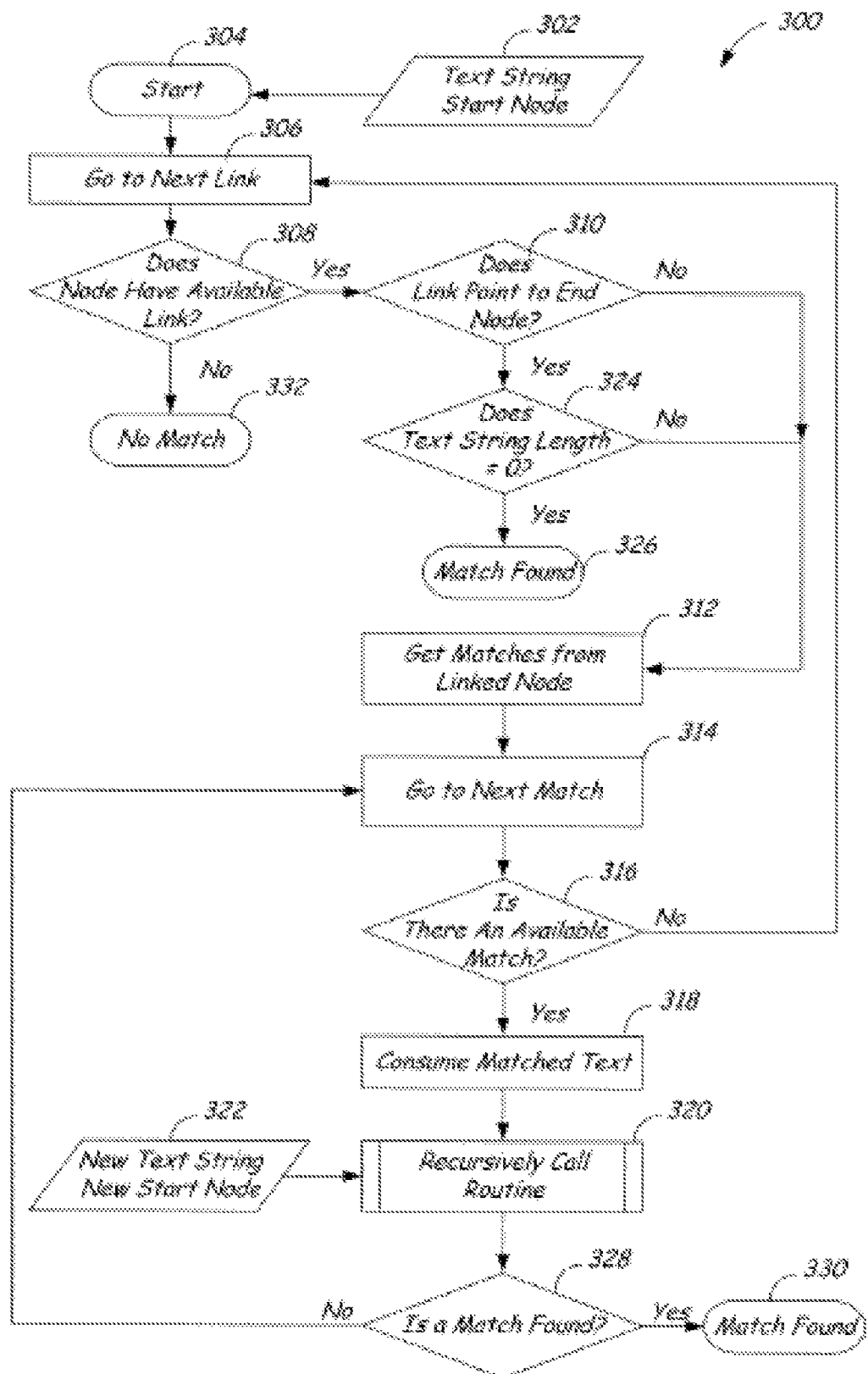
FIG. 4 is a flow diagram illustrating a method of traversing the rules and lexicons of FIG. 2 to verify the validity of a compound word.

The rules and lexicon are accessible by the compound word analyzer 20 for the purposes of performing recognition of a textual input string. The discussion of the rules above is focused on the function of the specific rules. FIG. 4 is a functional block diagram of an algorithm 300 suitable for use by compound word analyzer 20 to accessing the rules data store 22 and the lexicon data store 24 to apply the rules to the textual input string 14. Algorithm 300 is a recursive routine that provides a textual input string and points to a rule to traverse verify whether the textual input string provided is a valid compound word The following illustrative example illustrates how algorithm 300 accesses the rules data store 22 and the lexicon data store 24 to verify whether an input string is a valid compound word. When the algorithm 300 is called, input data 302 is provided to a start block 304. Input data 302 includes a text string to be verified and a start node for a particular rule to be used. In this particular example, the textual input provided is "doghouse" and the start node is node 204 in FIG. 3—that is, the start node of rule 202. It is assumed for the purpose of this discussion that the lexicon data structure 100 and the rules data structure 150 are used as illustrated in FIG. 2.

Moving to block 306, the rule is traversed by going to the next available link. Node 204 has one available link, link 206. Thus, the decision block 308 provides an affirmative answer and the algorithm 300 moves to decision block 310. The current link 206 is checked to see whether it points to an end node. Current link 206 does not point to an end node, and so the algorithm 300 moves to segment node 208 and applies the segment node 208 to the input text to get all matches.

As discussed above, the textual input is "doghouse". The segment node 208 reviews the lexicon data structure 100 for all entries that have a seg1 as meta data. There are three entries 102, 104, and 108 in the lexicon data structure 100 that have a seg1 as part of their meta data. However, of these, only entry 102 has a segment field 110 that matches the beginning of the textual input exactly. Thus, there is only one match, entry 102.

At step 314, the algorithm 300 goes to the next match, which in this case is the first match. At decision block 316, the algorithm 300 determines whether there is an available match. In this case there is a match, entry 102. The next step is to consume the matched text at block 318 and recursively call algorithm 300 at block 320 for a second call of the algorithm. Inputs for the recursive call are the text string after the consumption of the matched text in step 318, which in this case is "house" and the new start node, which is segment node 208 as is represented by data block 322.

Once the routine is recursively called, at step 306, the algorithm 300 goes to the next link. From node 208, the next link is link 210. At block 308, it is decided that there is an available link and at block 320, in is determined that the link does not point to an end node. At block 312, the algorithm looks for matches from the linked node. Because link 210 links back to node 208, all "seg1" entries are checked to see if there are any matches with the textual input, "house". In this case, there are no available matches, as entry 106 is not a seg1 entry. At block 316, there is no match to go to and at decision block 316, the answer to the question of whether there is an available match is no. Thus, the algorithm returns to block 306 and goes to the next link.

The next available link at block 306 is link 212. Since there is an available link at decision block 308, and the link is not to an end node at decision block 310, the lexicon data structure 100 is searched for matches at block 312. The currently linked node is segment node 214. Three of the entries, 104, 106 and 108 are not seg2 entries. Of those three, only entry 106 matches the textual input of "house".

At block 314, the next match is entry 106. At block 316, there is a match, so at block 318, the matched text is consumed. The algorithm 300 is recursively called at block 320 with a new text string and a new start node, as is represented at block 322. The new start node is node 214. The new test string is illustratively a null string, as the last match consumed all of the rest of the text.

Once the algorithm is recalled, now for the third time, the rule is traversed to the next link at block 306. There is an available link and it is link 216. Thus, at decision block 308, the answer is affirmative. At decision block 310, the link does point to an end node, so the algorithm moves to block 324. As mentioned above, the textual string is a null string and has a length of zero. Thus, at block 324, the answer is yes, and at block 326 the algorithm 300 terminates its third call with and returns a match found at block 326.

Once the third call is terminated, the algorithm 300 returns to the second call and decision block 328. As discussed above, the third call returned a match found. Thus, the answer to the decision block 328 is affirmative and the second call terminates at block 330 with a match found. Once the second call is terminated the algorithm returns to the first call at block 328. Once again, the answer returned from the second call was a match found, so the answer provided to block 328 is affirmative, and the first call of the algorithm 300 returns a match found at block 330. Thus, the textual input "doghouse" is verified as a valid compound word.

As another example, instead of having an textual input of doghouse, the textual input is "doghouses". The first call of the algorithm 300 illustratively matches "dog" and the second call illustratively matches "house". However, the third call of algorithm 300 would have an input text string of "s" and a new start node of 214. At block 308, there is an available link, but at block 310, the link 216 points to an end node 218. In this case, at block 324, the text string length is not zero. Thus, the algorithm attempts to get matches from the linked node at block 312. However, there are no matches, because the linked node is end node 218. Thus at decision block 316, there is no available match and the algorithm returns to block 306 to go to the next link. However, there are no more available links and at decision block 308, the algorithm branches to block 332, which terminates the third call with a return message of no match. Returning to the second call, at block 328, a negative answer causes the algorithm to branch to block 314, and attempt to go to another match. If the word "houses" were a part of the lexicon data structure 100, there would be multiple matches. However, it is not, so at block 316, the algorithm branches to block 306 to go to the next link, which is link 216. Eventually, the second call will return a no match and the process will be repeated with the first call. Ultimately, the algorithm 300 will return a no match.

The preceding examples illustrate the use of algorithm 300 to verify whether textual inputs could be validated by accessing the rules data structure 150 and the lexicon data structure 100. The word "doghouse" can be verified by calling algorithm 300 to test the word against entry 152 of the rules data structure 150. The word "doghouses" however, cannot be validated against entry 152 of rules data structure 150. If a word such as doghouses cannot be verified by entry 152, algorithm 300 would be called with each entry in the rules data structure in an attempt to verify the word. None of the rules and lexicon would verify the word, but other words not verifiable by the entry 152 can be verified by subsequent calls of algorithm 300 using other entries in the rule data structure 150. For example, the string "houseing" would be verified by entry 156 and the string "abdcdehoting" would be verified by entry 158. Although these are not actually properly spelled English words, for the purposes of this discussion, they would be validly recognized compound words. It should be appreciated that algorithm 300 is but one example of an algorithm that can be used to verify whether textual inputs could be validated by accessing the rules data structure 150 and the lexicon data structure 100. Other algorithms, for example, can traverse a textual from right to left or from any position in the textual string outward.

The systems and methods for compound word verification discussed above provide important advantages. The rules and lexicon data structures can be modified easily such as by using a text editor without requiring a recompilation of the algorithms used to access the data structure. This allows for one algorithm that can be used by multiple applications and in multiple languages. The systems and methods discussed above can be employed on word breaking for search engines, grammar checking, spell checking, handwriting and speech-recognition, machine translations, text mining and the like.

Figure 5:
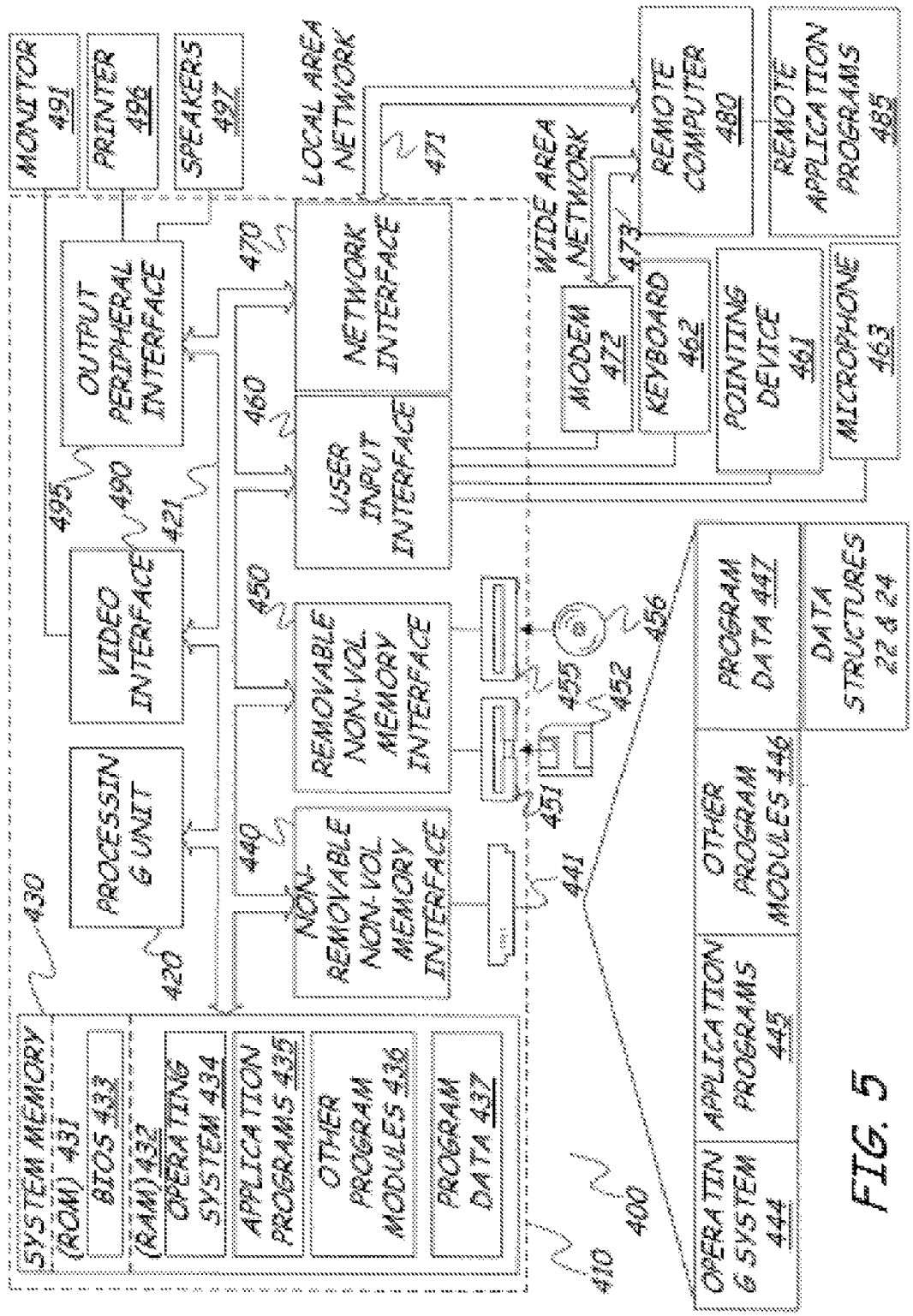
FIG. 5 is a block diagram of one computing environment in which some embodiments may be practiced.

FIG. 5 illustrates an example of a suitable computing system environment 400 on which embodiments may be implemented. The computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 5, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. The types of media discussed above can provide storage for the lexicon data storage 22 and the rules data storage 24. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 5 illustrates operating system 434, application programs 435, other program modules 436, and program data 437.

The computer 410 may also include other removable/non-removable volatile/nonvolatile computer storage media. By way of example only, FIG. 5 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 5, provide storage of computer readable instructions, data structures, program modules and other data for the computer 410. In FIG. 5, for example, hard disk drive 441 is illustrated as storing operating system 444, application programs 445, other program modules 446 such as the engine 12 discussed above, and program data 447 such as the lexicon data store 22 and the rules data store 24. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 5 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 5 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising;
   a processor;
   a lexical data store having a plurality of lexical entries, each lexical entry having a segment field and a metadata field, the segment field identifying a textual string and the metadata field identifying one or more segment identifiers that are different than the textual string and are mapped to the textual string by the lexical entry;
   a rules data store having a plurality of rule entries, each rule entry representing a rule that indirectly identifies valid compound words by identifying, in the rule entry, at least one segment identifier and an operation to be performed on textual strings that are mapped to the at least one segment identifier in the lexical data store to form the valid compound words; and
   memory storing executable instructions, which, when executed by the processor, configure the computing system to:
      receive an input signal indicative of a textual input;
      access a rule entry in the rules data store representing a particular one of rules;
      parse the particular rule into a rule structure that represents the at least one segment identifier and the operation from the accessed rule entry;
      determine whether the textual input comprises a valid compound word, by applying the rule structure to the textual input to match the textual input to a textual string identified from the lexical data store based on the at least one segment identifier and the operation represented by the rule structure; and
      generate and electronically transmit, through a communication interface, an output indicative of the determination whether the textual input comprises a valid compound word.

2. The system of claim 1, wherein at least one segment identifier is mapped in the lexical data store to a plurality of different textual strings.

3. The system of claim 1, wherein the given rule represents a particular relationship between a first segment identifier and a second segment identifier.

4. The system of claim 3, wherein the textual input is determined to comprise a valid compound word if the textual input includes a first textual string to which the first segment identifier is mapped, a second textual string to which the second segment identifier is mapped, and the particular relationship between the first and second textual strings.

5. The system of claim 3, wherein at least one of the lexical entries maps a plurality of different segment identifiers to a same textual string.

6. The system of claim 3, wherein the first segment identifier is mapped to a plurality of different textual strings.

7. The system of claim 6, wherein the textual input is determined to comprise a valid compound word if the textual input includes one of the plurality of different textual strings in the particular relationship with a second textual string to which the second segment identifier is mapped.

8. The system of claim 1, wherein the rule structure includes nodes that represent the segment identifiers and are connected by links that represent the relationship between the segment identifiers.

9. The system of claim 8, wherein the instructions configure the system to apply the rule structure by traversing a traversal path in the rule structure and identifying segments corresponding to the nodes along the traversal path.

10. The system of claim 9, wherein the rule structure has multiple traversal paths.

11. The system of claim 1, wherein the instructions configure the system to modify the lexical data store using a text editor.

12. The system of claim 1, wherein the instructions configure the system modify the rules data store using a text editor.

* * * * *